Patented Nov. 11, 1952

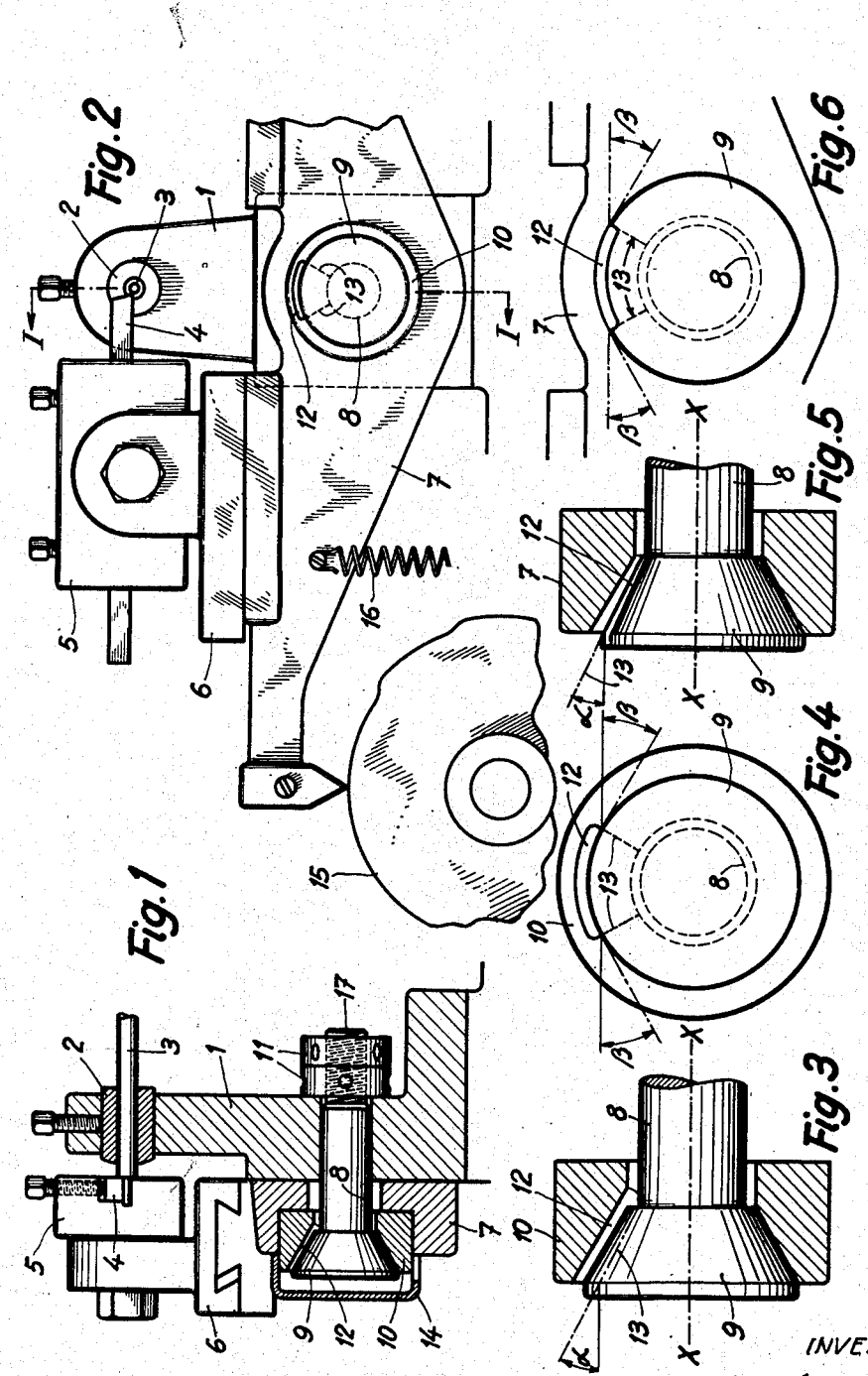

2,617,691

UNITED STATES PATENT OFFICE 2,617,691

BEARING ASSEMBLY FOR PIVOTED BODIES

André Bechler, Moutier, Switzerland

Application February 24, 1949, Serial No. 78,060
In Switzerland February 25, 1948

4 Claims. (Cl. 308—2)

This invention relates to a bearing assembly for a pivoted body particularly as applied to automatic lathes of the kind having a cam actuated lever mounted on a tapered pivot, for bringing tools into engagement with a workpiece.

Such arrangements are well known in the art referred to. It is also known that there must be necessarily a minute clearance between the lever and its pivot, and this clearance must be filled with an oil film preventing any binding action. In all conventional bearings of the sliding bearing type for supporting a lever on a pivot, the cross sections of the sliding surfaces of the bearing device have an uninterrupted, circular configuration. On account of the above mentioned clearance, the sliding surfaces contact each other along a single line which appears as a point in the cross-section of the device. This point is situated on the line of action of a radial force resulting from the forces acting on the lever. When the lever is rotated, it will perform a rolling movement as if the sliding surfaces of the lever and of the pivot were shaped as intermeshing teeth of an internal (epicyclic) gear, such movement having a horizontal component. Upon change of direction of the radial force acting on the lever, the sliding surfaces of the bearing will perform a relative movement having a horizontal component, such a movement taking place whether the lever is rocked or not. The amplitude of this relative movement may amount to the difference of the diameters of the sliding surfaces of the bearing.

If the lever referred to is on a machine tool, for example an automatic lathe, and carries a tool to be brought into engagement with a work piece through a rocking movement of the lever, such rocking movement being caused by a cam, the horizontal component of the above mentioned minute relative movement will necessarily be transmitted to the tool, thereby causing an inaccuracy in the diameter of the work piece. In the case of a lathe, the inaccuracy in diameter of the work piece is twice as great as the said horizontal component of the movement of the lever relative to its pivot. This component of movement may amount to several thousandths or even hundredths of a millimeter, depending on the play provided in the bearing of the lever, and the inaccuracy in the diameter of the workpiece will be correspondingly great. Such inaccuracies of operation constitute a serious disadvantage of conventional machine tools in which the tool is supported on a lever controlled by a cam.

The primary object of this invention is to eliminate the undesired effect of the clearance between the sliding surfaces of a tool-carrying lever of an automatic lathe and the pivot of this lever, and not to eliminate the clearance itself, which must necessarily be provided.

According to the invention, a recess of such configuration is provided in one of the cone-shaped sliding surfaces of the lever and of the pivot that the lever bears on the pivot under the load of a spring and of its own weight along two generatrices confining the recess laterally so as to provide a V-support for the lever.

According to the invention, the axis of symmetry of the recess is situated in a vertical plane extending through the longitudinal axis of the pivot. The circumferential extension of the recess and the taper of the slide surfaces of the bearing are such that the angles which the generatrices described in the paragraph next above form with a horizontal plane, and also the angles which the tangents to the cone at any point of said generatrices form with said horizontal plane, are greater than the angle of friction of rest between the materials of said lever and pivot.

The reason for the requirement quoted above is this: The portions of the recessed sliding surface, which are located adjacent to the generatrices of the cone surface and which confine the recess laterally, form the bearing surfaces of the aforementioned V-support and must slope sufficiently to prevent the lever supported thereon from moving in horizontal direction under the action of any horizontal component of a force acting on the lever. The required degree of this sloping is determined by the angle of friction of rest of the contacting surfaces.

Other objects of the invention will appear hereinafter as the description of the invention proceeds, the novel features, combinations and construction being more particularly pointed out in the specification and the claims hereunto appended.

In the accompanying drawings, which represent, by way of example, two embodiments of the invention, but only to such an extent as is necessary to permit said invention being well understood by those skilled in the art:

Fig. 1 is a sectional view of a device according to the invention, the section being made along line I—I of Fig. 2;

Fig. 2 is a fractional end elevational view of a machine equipped according to the invention;

Fig. 3 shows a portion of Fig. 1 on a larger scale;

Fig. 4 is an end view of the device shown in Fig. 3;

Figs. 5 and 6 are views similar to those of Figs.

3 and 4, respectively, of a modified device according to the invention.

Like parts are designated by like numerals in all figures of the drawing.

Referring more particularly to Figs. 1 to 4, 1 designates the frame of a lathe. A sleeve 2 receives the work 3. A cutting tool 4 working on the bar 3 is held in a tool holder 5 movably mounted by means of a slide 6 on a lever 7. The latter is actuated by a cam 15 onto which it is pressed by a spring 16, and is rocked on a pivot whose shank 8 extends through frame 1. A tapered portion or cone 9 of the pivot is adjustably held in a collar 10 fitted in lever 7 and pressing the latter to the frame. The portion of the pivot can be axially adjusted by manipulating nuts 11, which are screwed onto the threaded end 17 of the pivot shank, for adjusting the axial, as well as the radial, play of the bearing.

The collar 10 has a conical cavity conforming with the pivot taper 9 which has a recess 12 laterally limited by two generatrices 13 of said taper or cone. These generatrices form with the horizontal plane X—X, in which the axis of the pivot is located, an angle $\alpha$ which is greater than the friction angle of the materials from which the lever and the pivot are made. Furthermore, the angle $\beta$ (see Fig. 4) between the tangent to said cone at any point of the generatrices and any horizontal plane, for example the plane extending through a point of contact between parts 9 and 10 at one of said generatrices, is also greater than the aforementioned angle of friction of rest. This arrangement results in a V-shaped support for the lever and assures exact rotary movement of the latter and prevents any other, particularly horizontal, movement transversely to the axis of the pivot, so that the tool can be precisely adjusted. A cover 14 fitted on collar 10 seals the bearing assembly and protects the recess against entry of chips. The collar 10 could be dispensed with and the recess be worked in the lever itself which would then present a conical bearing surface.

In the embodiment shown in Figs. 5 and 6, the recess is worked in the cone 9 of the pivot, which contacts the lever 7. The position of the generatrices 13 which limit the recess laterally is the same with respect to the horizontal plane X—X as in the modification of the invention illustrated in Figs. 3 and 4. Consequently the operation of the assembly according to Figs. 5 and 6 is the same as of that shown in Figs. 3 and 4.

While I have described and illustrated two embodiments of my invention, I do not wish to unnecessarily limit the scope of this invention, but reserve the right to make such modifications and rearrangements of the parts as may come within the purview of the accompanying claims.

What I claim is:

1. In a bearing assembly for a pivoted body, a body rotatably mounted on a pivot, both the body and the pivot having a co-acting conical surface, one of these co-acting conical surfaces having a recess of such configuration that the body bears on the pivot under the normal load along two generatrices limiting said recess laterally, the angles which said generatrices form with a horizontal plane and the angles which the tangents to the conical surfaces at any point of said generatrices form with said horizontal plane, being greater than the angle of friction of rest between the materials of which said body and pivot are made.

2. In a bearing assembly according to claim 1, said recess being in the conical surface of the pivot.

3. In a bearing assembly according to claim 1, said recess being in the conical surface of the body.

4. In a bearing assembly according to claim 1, a sealing cover connected with said body and covering said recess.

ANDRÉ BECHLER.

REFERENCES CITED

The following references are of record in the file of this patent:

UNITED STATES PATENTS

| Number | Name | Date |
|---|---|---|
| 2,389,687 | Rickemann | Nov. 27, 1945 |
| 2,395,365 | Wilson | Feb. 19, 1946 |